United States Patent
Sawant et al.

(10) Patent No.: US 8,745,097 B2
(45) Date of Patent: Jun. 3, 2014

(54) EFFICIENT XML/XSD TO OWL CONVERTER

(75) Inventors: Kiran Prakash Sawant, Mumbai (IN); Suman Roy, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 13/368,175

(22) Filed: Feb. 7, 2012

(65) Prior Publication Data
US 2013/0204910 A1    Aug. 8, 2013

(51) Int. Cl.
*G06F 17/30* (2006.01)

(52) U.S. Cl.
USPC .......................................................... 707/811

(58) Field of Classification Search
CPC .................................................. G06F 17/3092
See application file for complete search history.

(56) References Cited

U.S. PATENT DOCUMENTS

| | | | |
|---|---|---|---|
| 7,516,229 B2 | 4/2009 | Trastour et al. | |
| 2008/0147713 A1 | 6/2008 | Lemcke et al. | |
| 2009/0254574 A1 | 10/2009 | De et al. | |
| 2010/0228782 A1 | 9/2010 | Rao et al. | |

FOREIGN PATENT DOCUMENTS

| KR | 20050060521 | 6/2005 |
|---|---|---|
| KR | 20090084573 A | 8/2009 |

OTHER PUBLICATIONS

Lacoste et al. "An efficient XML to OWL converter", Feb. 2011, ACM, pp. 145-154.*

Battle, "Round-tripping between xml and rdf.," *In In International Semantic Web conference (ISWC)*, Hiroshima, Japan, 2004. Springer.
Bohring et al., "Mapping xml to owl ontologies," *In Leipziger Informatik-Tage, LNI*, vol. 72, pp. 147-156. GI, 2005.
Ferdinand et al., "Lifting xml schema to owl," *Web Engineering*, pp. 354-358, 2004.
Horrocks et al., "From shiq and RDF to OWL: The making of a web ontology language," *Journal of Web Semantics*, 1:2003, 2003.
Lacoste et al., "An efficient XML to OWL converter," *ISEC '11*, Feb. 23-27, 2011, Kerala, India, 10 pages.
Oh et al., "Design and users' evaluation of a topic maps-based Korean folk music retrieval system," *TMRA 2006, Lnai 4438*, pp. 74-89, Berlin Heidelberg, Springer, 2007.
Reynolds, "Topic map authoring with reusable ontologies and automated knowledge mining," *XML 2002 Proceedings by deepX*, 10 pages, 2002.

(Continued)

*Primary Examiner* — Christyann R. Pulliam
*Assistant Examiner* — Dinku Gebresenbet
(74) *Attorney, Agent, or Firm* — Klarquist Sparkman, LLP (57) ABSTRACT

Techniques and tools are described for converting XML documents and XML schema documents to OWL. An OWL model ontology can be generated by receiving XML schema documents, performing schema consolidation, and generating the OWL model ontology from the consolidated XML schema. An OWL instance ontology can be generated by receiving XML documents and XML schema documents and generating an OWL instance ontology from the XML documents and the XML schema documents. OWL model extraction and OWL instance generation can be performed in parallel and without the need for intermediate XSLT documents. Schema consolidation can comprise collecting schema documents, merging schema documents, and reorganizing the merged schema document to create a consolidated schema document.

17 Claims, 7 Drawing Sheets

SOFTWARE 780 FOR DESCRIBED TECHNOLOGIES (56) References Cited

OTHER PUBLICATIONS

Rodrigues et al., "Mapping XML to Existing Owl Ontologies," <http://citeseerx.ist.psu.edu/viewdoc/download?doi=10.1.1.101.292&rep=rep1&type=pdf> International conference WWW/Internet, 8 pages, 2006.

Sawant et al., "Creating and benchmarking OWL and topic map ontologies for UBL processes," in *Infosys SETLabs Briefings, Some Perspectives on Software Engineering*, vol. 8, No. 6, pp. 29-44, 2010.

Thuy et al., "DTD2OWL: Automatic transforming XML documents into OWL ontology," *ICIS 2009*, Nov. 24-26, 2009, Seoul, Korea, 7 pages.

Yi, "Information organization and retrieval using a topic maps-based ontology: results of a task-based evaluation," *Journal of the American Society for Information Science and Technology*, 59(12), pp. 1898-1911, Jul. 8, 2008.

* cited by examiner

EFFICIENT XML/XSD TO OWL CONVERTER

BACKGROUND

Extensible Markup Language (XML) has become a standard data exchange format in electronic business. Although XML can support syntactic interoperability, problems arise when data sources represented as XML documents need to be integrated. On reason is that XML lacks support for efficient sharing of conceptualization. The Web Ontology Language (OWL) can play an important role as it can enable semantic interoperability and it supports the representation of domain knowledge using classes, properties, and instances.

In some situations, there is a need to convert XML documents to OWL ontologies. This area of research has received some attention, and there are a few existing tools. However, the existing tools have a number of shortcomings. For example, the existing tools do not address the handling of characteristics such as internal references, imports, includes, etc. These aspects are commonly used in XML schemas.

Therefore, there exists ample opportunity for improvement in technologies related to generating OWL ontologies from XML.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and tools are described for converting XML (e.g., XML documents and/or XML schema documents) to OWL. For example, OWL model extraction can be performed by receiving XML schema documents (XSDs), performing schema consolidation, and generating an OWL model ontology. OWL instance generation can be performed by receiving XML documents and XML schema documents and generating an OWL instance ontology.

As another example, a method is provided for converting extensible markup language (XML) to web ontology language (OWL). The method comprises receiving one or more XML documents, receiving a plurality of XML schema documents, performing model extraction using the plurality of XML schema documents, performing instance generation using the one or more XML documents and the plurality of XML schema documents to create an OWL instance ontology. The model extraction comprises performing schema consolidation on the plurality of XML schema documents to generate a consolidated XML schema document, and generating, using the consolidated XML schema document, an OWL model ontology. The method can also comprise outputting the OWL model ontology and the OWL instance ontology (e.g., to a file).

As another example, a framework is provided for converting XML to OWL. The framework comprises a model extraction component configured to perform operations comprising: receiving a plurality of XML schema documents, performing schema consolidation on the plurality of XML schema documents to generate a consolidated XML schema document, generating, using the consolidated XML schema document, an OWL model ontology, outputting the OWL model ontology. The framework further comprises an instance generation component configured to perform operations comprising: receiving one or more XML documents, receiving the plurality of XML schema documents, generating, using the one or more XML documents and the plurality of XML schema documents an OWL instance ontology, and outputting the OWL instance ontology.

The foregoing and other objects, features, and advantages of the invention will become more apparent from the following detailed description, which proceeds with reference to the accompanying figures.

DETAILED DESCRIPTION

The following description is directed to techniques and solutions for converting extensible markup language (XML) to web ontology language (OWL). For example, OWL model extraction can be performed by receiving XML schema documents (XSDs), performing schema consolidation, and generating an OWL model ontology. OWL instance generation can be performed by receiving XML documents and XML schema documents and generating an OWL instance ontology. XML schema consolidation can be performed by collecting schema documents, merging schema documents, and/or reorganizing schema documents. OWL model extraction and OWL instance generation can be performed in parallel. Furthermore, OWL model extraction and OWL instance generation can be performed without using an intermediate Extensible Stylesheet Language Transformations (XSLT) document.

XML Documents

Extensible Markup Language (XML), as a standard for data exchange, has become a central component of modern data management. XML was introduced in the document community as a subset of Standard Generalized Markup Language (SGML). XML is, in some sense, an augmentation of HyperText Markup Language (HTML) allowing annotations of data with information about its meaning rather than just its presentation. An XML document consists of nested elements, with ordered sub-elements. Each element has a name, also called a tag or label. The simplest abstraction of an XML document can be provided by a labeled ordered tree (with labels on nodes), possibly with data values associated to the leaves. Additionally, XML provides a referencing mechanism among its elements.

The basic schema mechanism for XML is provided by Data Type Definitions (DTDs). Most recently, many schema languages extending DTDs have been proposed, including XML Schema (XSD), document structure definition (DSD), etc. These proposals are available from the World Wide Web Consortium (W3C®).

Web Ontology Language (OWL)

The Web Ontology Language is a semantic markup language proposed by the W3C. OWL is developed as a vocabulary extension of Resource Description Framework (RDF). While the syntax of OWL corresponds to that of RDF, the semantics of OWL are extensions of Description Logic (DL).

Ontologies provide a formal approach to specifying shared conceptualization, which in turn can enable semantic interoperability. OWL can support the domain ontology using classes, properties, and instances.

Converting XML Schemas to OWL Model Ontologies

In the techniques and solutions described herein, XML schemas (e.g., obtained from one or more XML schema documents (XSDs)) are converted into an OWL model ontology. In some embodiments, converting XML schemas to an OWL model is performed using three relations: classes to define concepts, object properties to relate different objects together, and datatype properties to relate objects to data type values.

The procedure of converting XML schemas to an OWL model can be called OWL model extraction. OWL model extraction can provide support for internal references, includes and imports, and enumerations.

For handling xsd:complexTypes and xsd:elements classes are generated according to rules as follows. An element in the source XML tree, being a leaf containing only a literal or an attribute, is mapped to an owl:DatatypeProperty having the surrounding class as the domain. For any other sub-element, it is mapped to an owl:ObjectProperty with the source element as the domain and the sub-element as the range. For nested elements, when one element contains another element (neither a literal nor an attribute) a "part-of" relationship is used. This corresponds to an owl:ObjectProperty, which establishes a relationship between two classes.

XML schemas also contains arity constraints like xsd:minOccurs and xsd:maxOccurs which are mapped to equivalent cardinality constraints owl:minCardinality and owl:maxCardinality respectively in OWL. For elements appearing in xsd:sequence and xsd:all, they are grouped into the complex class owl:intersectionOf.

Table 1 below summarizes a mapping from XML schema elements to OWL elements in a specific implementation.

TABLE 1

Mapping between elements of XSD and OWL

| XSD Elements | OWL Elements |
| --- | --- |
| xsd:elements, containing other elements or having at least one attribute | owl:Class, coupled with owl:ObjectProperties |
| xsd:elements, with neither sub-elements nor attributes | owl:DatatypeProperties |
| named xsd:ComplexType | owl:Class |
| named xsd:SimpleType | owl:DatatypeProperties |
| xsd:minOccurs, xsd:maxOccurs | owl:minCardinality, owl:maxCardinality |
| xsd:sequence, xsd:all | owl:intersectionOf |

In other implementations, different mappings of XML schema elements to OWL elements can be used.

Converting XML Instances to OWL Instances

In the techniques and solutions described herein, XML instances can be converted to OWL instances. For example, an OWL instance ontology can be generated from XML documents and XML schema documents.

Past approaches to converting XML instances to OWL instances have used an intermediate XSLT file to process the XSDs. This intermediate XSLT file would extract the required semantics from the XSDs, which are not available directly from the XML instance file. This captures the data types of the actual text values given in the XML instance file, and the cardinalities for both data type properties and object properties. Such information can be determined by referring to the XSDs. So, an intermediate XSLT was created which captured this information from the XSDs, and the XSLT file was used to add the XML instances to the ontology.

The approach described herein eliminates the two-step approach (using the intermediate XSLT file) and achieves the same result in a single step. This is done by taking both XML instance(s) and the XSD file(s) as inputs, which allows reference to the XSDs to get the necessary semantic information for combining with the XML data in generating the instance ontology. In this way, a generic converter is produced, similar to the one used for model extraction, which can be used on any XML instance. In some implementations, the paths to the XSD files also need to be supplied.

In the two-step approach, multiple copies of the intermediate XSLT files need to be maintained in a proper manner, so that they can be used to handle different ontologies. If a wrong intermediate XSLT file is used for the conversion, then it would create an incorrect instance ontology. In the approach described herein, there is no need to maintain different XSLT files, as a single program file is capable of handling the instance generation procedure for any ontology without the need of using an intermediate XSLT file.

Schema Consolidation

In the techniques and solutions described herein, schema consolidation techniques are employed in processing XML schema documents (XSDs) as part of converting XML schemas to OWL models.

Schema consolidation is used in resolving both internal as well as external references. The internal references in an XSD file are the references that are made to other elements or data types which are present in the same XML schema document. The external references in an XML schema document are the references that are made to elements or data types that belong to a separate XML schema document. External references are made using either the "include" or "import" mechanisms. The "include" mechanism of the XML schema is similar to the "import" mechanism; the only difference being that in the case of "include" the namespace of the calling document is preserved, whereas in "import" the child document has its own namespace.

In a specific implementation, schema consolidation is performed in three stages. In the first stage, all of the files that are included and imported by the main XML schema are collected. The first stage also resolves potential issues such as resolving circular and multiple references. For example, it is possible for a schema to be referenced many times and to import schemas from which it was imported, which could lead to an infinite loop. The second stage merges the collected schemas into one schema document. The second stage also handles the namespaces. In the third stage, the merged schema document is reorganized to remove all internal references.

In the first stage of schema consolidation, all the schema files are collected. A listing can be generated for the collected schema files, comprising, for each schema file, the file's location, namespace, namespace prefix, and/or file name. In some implementations, a hash can be used to store each schema file's location, namespace, namespace prefix, and/or file name.

In a specific implementation, the first stage of schema consolidation is performed as follows. The algorithm collects, from an XML or an XML schema file, all the schemas included and their location, and stores them into a hash. At the same time it will store all the namespaces and their associated prefixes. The input file is parsed into a Document Object Model (DOM) representation. First all the namespaces are collected that are declared in the input file and stored along with their prefixes, if it is not yet done. If the input file is an XML file, the presence of the attribute "schemalocation" is tested on the root element which contains the location of the main schema file. The location of this main schema is stored in the hash. Also the location of this main schema file is stored separately for future reference. If the current file is an XSD file, we look for elements with the name "import" or "include". Then the value of the "schemalocation" attribute is obtained and added to the hash if it is not already present. This algorithm is repeated on this newly added schema file. For the case where the location of schemas may be given as a relative path, the path to the current directory is saved in a separate variable. Once the algorithm is finished the hash is available containing the locations of all the imported schema files without any duplicates.

In the second stage of schema consolidation, the imported and included schema files are merged into a main schema file. Merging the schema files can include incorporating the imported and included schema files into a main (e.g., a top-level) schema file, while also ensuring consistent use of the schema namespace element.

In a specific implementation, the second stage of schema consolidation is performed as follows. In this step all the imported schemas are merged into the main schema file. The main issue in this specific implementation is to take care of the different namespaces. This is done to ensure that the prefix associated with the defined namespace "http://www.w3.org/2001/XMLSchema" is the same in every schema file. Thus, for each schema file the prefix associated with this namespace is examined and if it is different from "xsd", it is replaced with "xsd" in every element and attribute (instead of "xsd," a different prefix can be used, so long as it is used for all elements and attributes thus maintaining consistent prefix). For each schema its namespace is identified, which is given by the "targetnamespace" attribute. Then the hash is examined for the prefix associated to this particular namespace. The prefix is then added to all the elements and attributes. The consistent prefix can be applied to all the schema documents before they are merged, or it can be applied after the schema documents have been merged to a single schema document.

In the third stage of schema consolidation, the merged schema file is reorganized. Reorganizing the merged schema file can comprise removing include and import elements that are no longer necessary as well as resolving internal references.

In a specific implementation, the third stage of schema consolidation is performed as follows. The merged schema may have a lot of internal references. If the internal references are not resolved beforehand, then when creating the model the element that is referenced would have to be examined and it might refer to another element, and so on. For a particular element, there may exist a lot of such internal references before it is finally defined. This would increase the complexity of the conversion process. In order to resolve this issue, all the internal references are removed by reorganizing the merged schema. The mechanism for this process is that if a node is making reference to an element, the element is appended to the current node, and then processing moves to its children. As a final portion of the third stage, all of the unnecessary elements are removed. For example, only the first element describing the root element of the XML file is needed, without any internal or external references, so these elements are deleted.

Methods for Converting XML/XSD to OWL

In the techniques and solutions described herein, methods can be provided for converting XML/XSD to OWL. For example, an OWL model can be generated from a plurality of XML schema documents (XSDs) and OWL instances can be generated from a plurality of XML documents.

Figure 1:
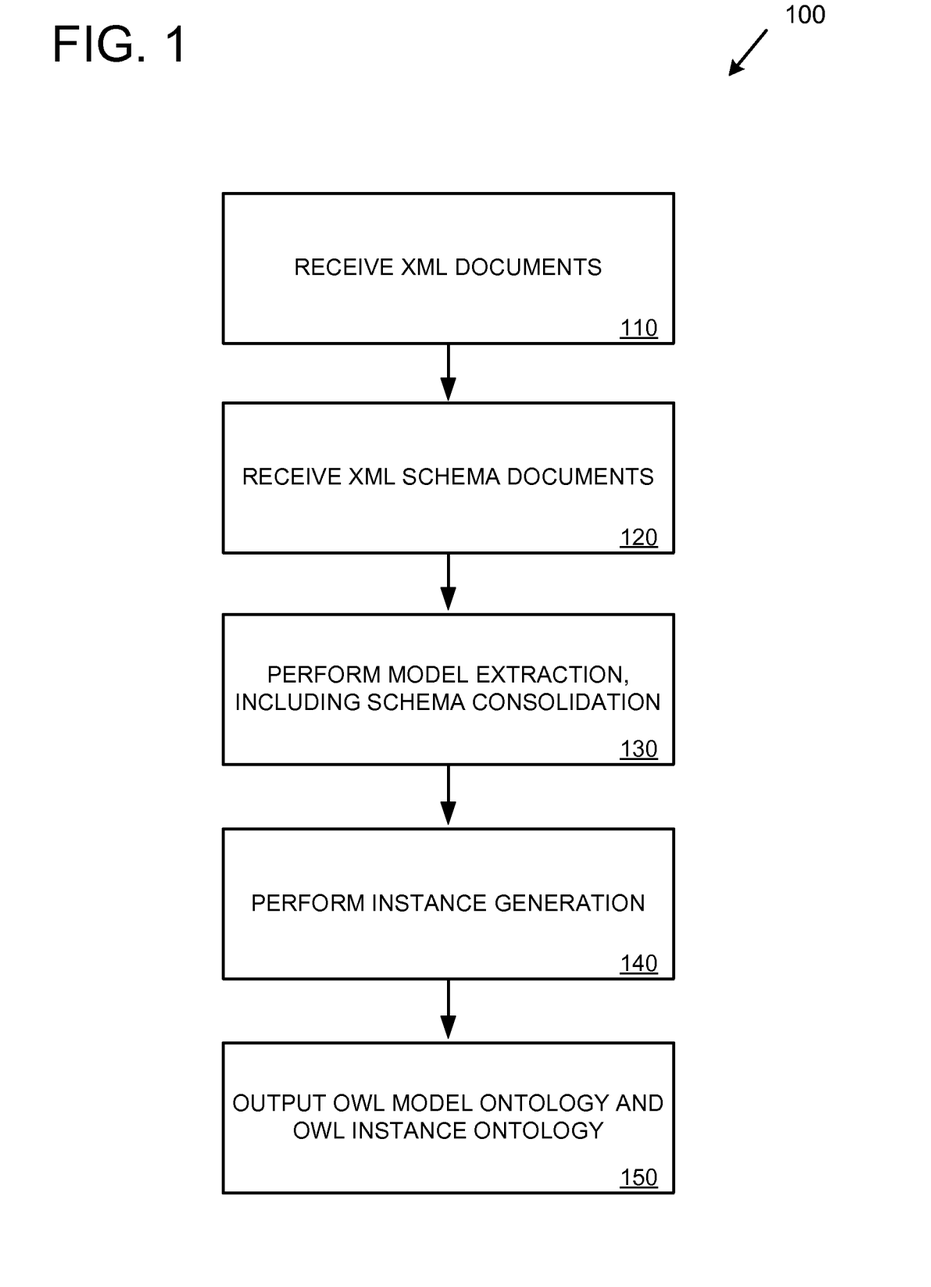
FIG. 1 is a flowchart showing an example method for converting XML to OWL.

FIG. 1 is a flowchart depicting an example method 100 for converting XML/XSD to OWL. At 110, one or more XML documents are received. At 120, a plurality of XML schema documents are received.

At 130, model extraction is performed. Model extraction generates an OWL model from, at least in part, the received XML schema documents 120. Model extraction 130 includes performing schema consolidation using the plurality of XML schema documents 120 to generate a consolidated XML schema document, and generating the OWL model using the consolidated XML schema document.

At 140, instance generation is performed. Instance generation generates OWL instances from, at least in part, the received XML documents 110 and the received XML schema documents 120.

At 150, the OWL model ontology and an OWL instance ontology are output. For example, the OWL model ontology and OWL instance ontology can be saved as files.

The example method 100 can provide for efficient conversion of XML/XSD to OWL. For example, model extraction 130 and instance generation 140 can be performed in parallel. In addition, schema consolidation can be employed to consolidate multiple schemas into a consolidated schema, which can be used to resolve includes and imports. Furthermore, conversion of XML/XSD to OWL can be performed without the need of intermediate XSLT files.

Figure 2:
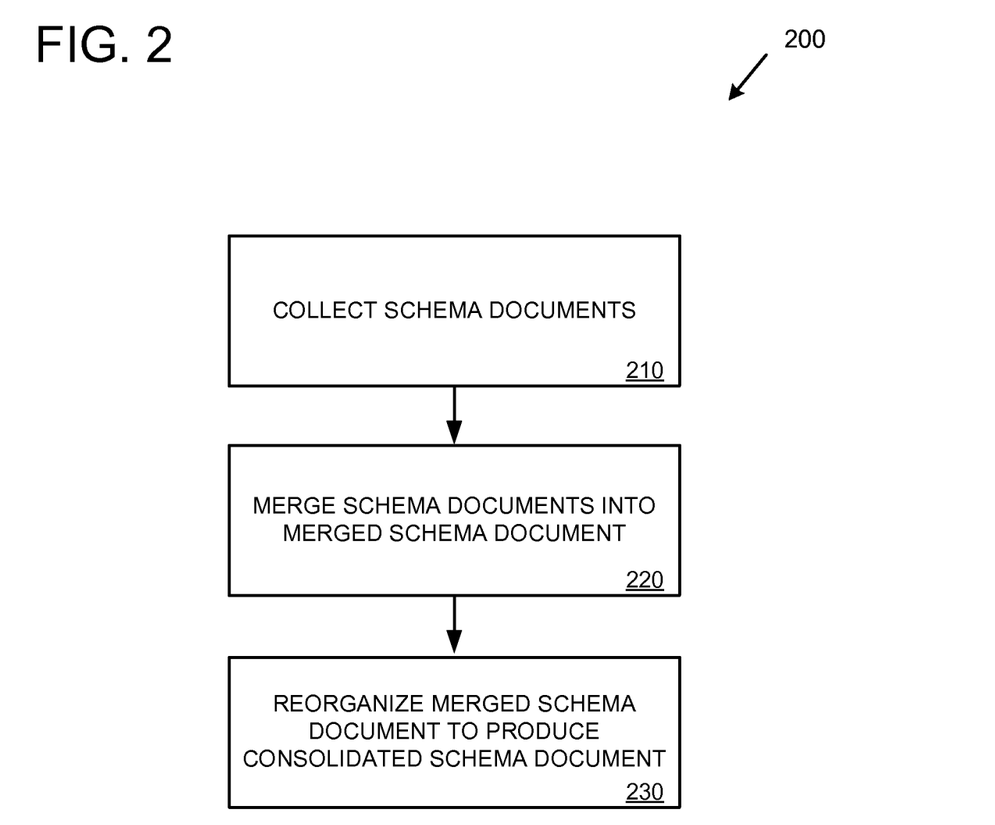
FIG. 2 is a flowchart showing an example method for performing schema consolidation.

FIG. 2 is a flowchart depicting an example method 200 for performing schema consolidation. The method 200 can be performed, for example, as part of OWL model extraction (e.g., as part of model extraction described above with regard to 130). The method 200 can also be performed independently of OWL model extraction (e.g., as a pre-processing step to prepare schema documents for further processing).

At 210, schema documents (e.g., XML schema documents) are collected. For example, a list can be compiled comprising attributes of the schema documents, including: location (e.g., schemalocation), namespace, namespace prefix, file name, etc. In some implementations, the list of schema attributes can be stored in a hash. Other information regarding the schema documents can also be stored, such as which schema document is the main schema document. For example, the main schema document can be the one that incorporates other schema documents (e.g., that includes or imports other schema documents).

At 220, the collected schema documents 210 are merged into a merged schema document. In some implementations, the collected schema documents (other than the main schema document) are merged into the main schema document. Merging the schema documents can comprise resolving differences in namespace. For example the same namespace prefix can be used for all elements and attributes that use a namespace prefix in the merged schema document.

At 230, the merged schema document is reorganized. Reorganizing the merged schema document can comprise resolving internal references and/or removing unnecessary elements (e.g., left over import or include statements). Once the merged schema file has been reorganized, it can be output (e.g., saved) as a consolidated schema file.

Framework for Converting XML/XSD to OWL

In the techniques and solutions described herein, a framework can be provided for converting XML/XSD to OWL. For example, an OWL model can be generated from a plurality of XML schema documents (XSDs) and OWL instances can be generated from a plurality of XML documents.

Figure 3:
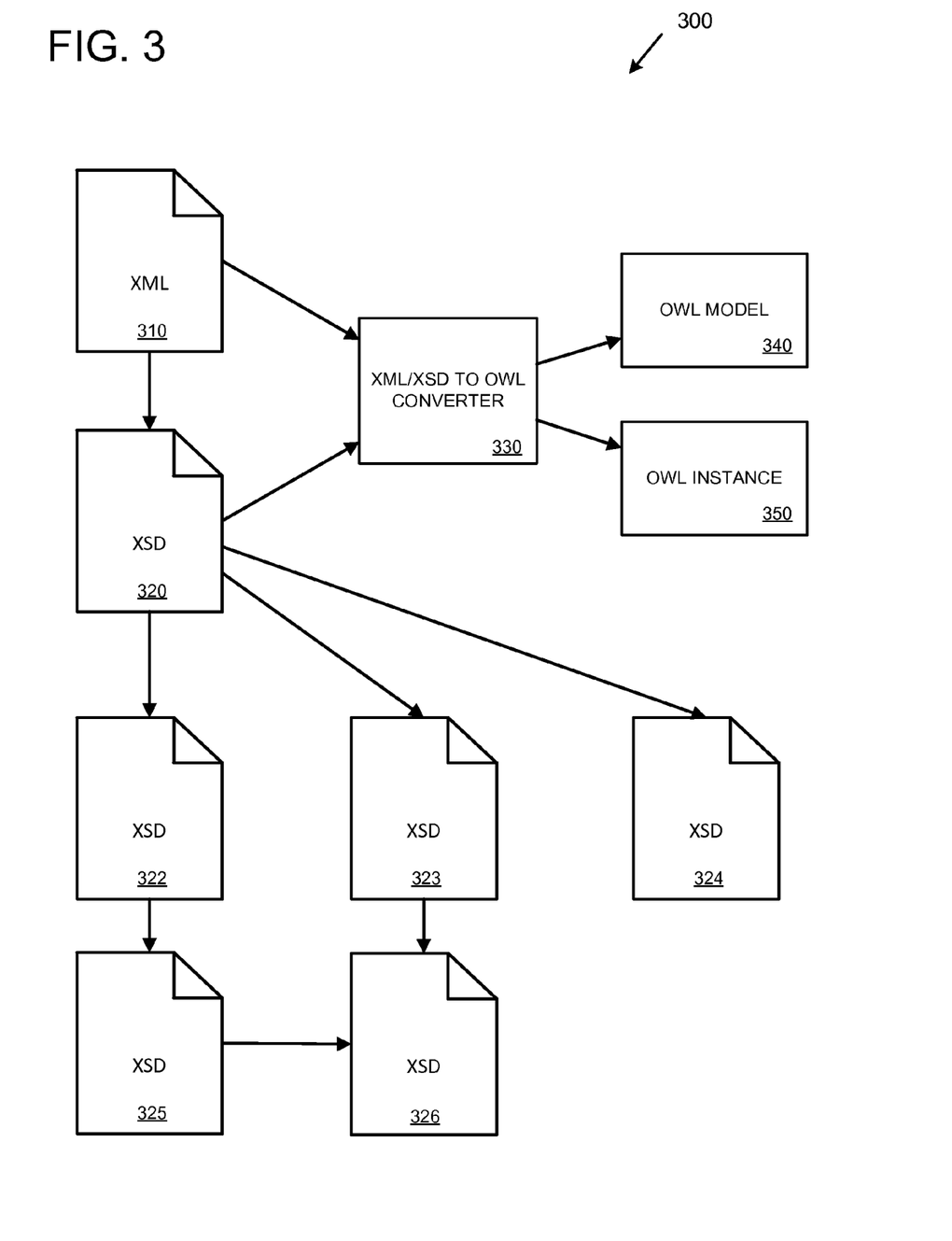
FIG. 3 is a diagram depicting an example environment for performing XML/XSD to OWL conversion.

FIG. 3 is a diagram depicting an example environment 300 for performing XML/XSD to OWL conversion. The environment 300 includes one or more XML documents 310. The environment 300 also includes a plurality of XML schema documents, including 320 and 322-326. Schema document 330 is a main schema document that includes or imports schema documents 322, 323, and 324. Schema document 322 includes or imports schema document 325. Both schema document 325 and 323 include or import schema document 326.

The environment 300 includes an XML/XSD to OWL converter 330. The converter 330 receives the XML documents 310 and the XML schema documents (XSDs) 330 and 322-326 and generates an OWL model 340 and OWL instances 350. In some implementations, the converter 330 comprises an OWL model extractor that produces the OWL model 340 using the XML schema documents 320 and 322-326, and an OWL instance generator that produces the OWL instances 350 using the XML documents 310 and the XML schema documents 320 and 322-326.

Figure 4:
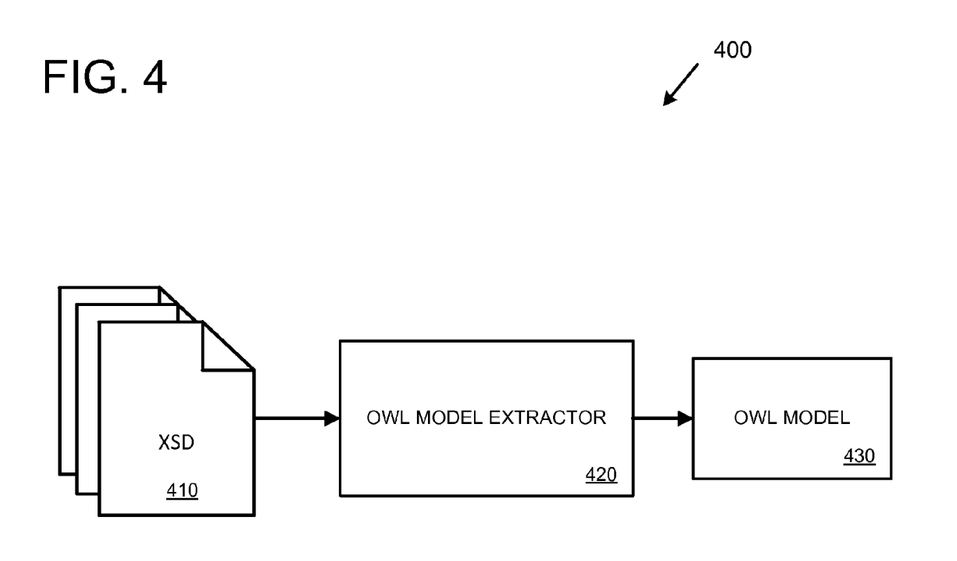
FIG. 4 is a diagram depicting an example framework for generating OWL models.

FIG. 4 is a diagram depicting an example framework 400 for generating OWL models. The example framework 400 includes an OWL model extractor 420. The OWL model extractor 420 receives a plurality of XML schema documents 410. From the XML schema documents 410, the OWL model generator 420 generates an OWL model ontology 430. In some implementations, the OWL model extractor 420 performs schema consolidation on the XML schema documents 410 to produce a consolidated XSD from which the OWL model ontology 430 is extracted.

Figure 5:
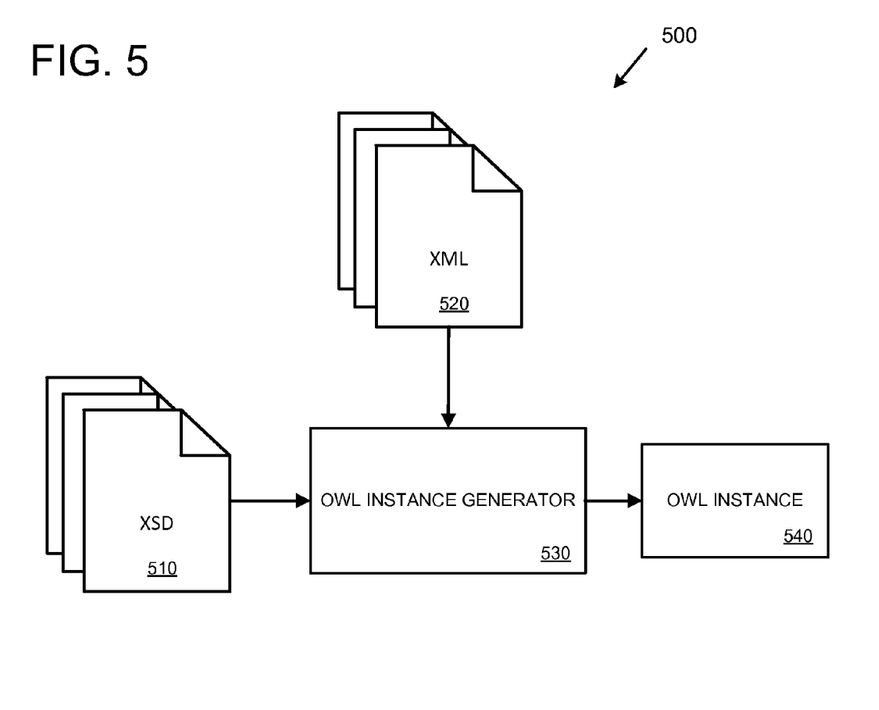
FIG. 5 is a diagram depicting an example framework for generating OWL instances.

FIG. 5 is a diagram depicting an example framework 500 for generating an OWL instance ontology. The example framework 500 includes an OWL instance generator 530. The OWL instance generator 530 receives a plurality of XML schema documents 510 and one or more XML documents 520 and generates an OWL instance ontology 540.

Figure 6:
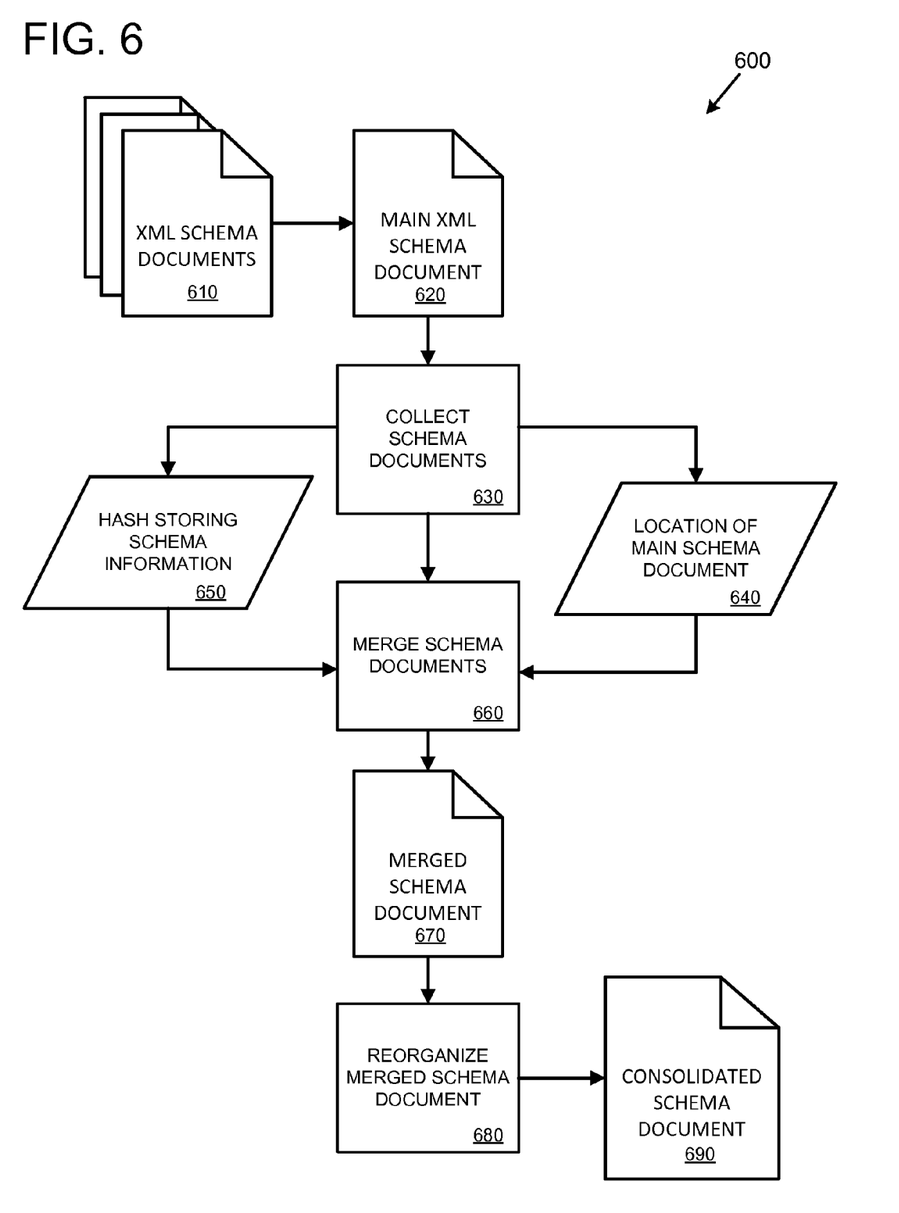
FIG. 6 is a diagram depicting example framework for generating a consolidated schema.

FIG. 6 is a diagram depicting an example framework 600 for generating a consolidated schema (e.g., from which an OWL model can be generated). In the example framework 600, a number of XML schema documents (610 and 620) are received as input. One of the XML schema documents 620 is designated as the main schema document (e.g., the main schema document may be the root of a tree of included/imported schema documents).

The example framework 600 includes a component for collecting schema documents 630, including schema documents 610 and 620. The schema collection component 630 processes the schema documents 610 and 620 and stores schema information in a hash 650 (e.g., schema information such as schema location, namespace, and namespace prefix for each schema document). The schema collection component 630 also stores the location of the main schema document 640.

The example framework 600 also includes a component for merging schema documents 660. The schema merge component 660 receives the schema files 610 and 620, the schema information 650, and the location of the main schema document 640 and generates a merged schema document 670. For example, the schema merge component 660 can ensure that the same namespace prefix is used throughout the merged schema document 670 as well as combine the schema documents 610 and 620 into the single merged schema document 670 (e.g., the merged schema document 670 can be the main schema document 620 after the other schema documents 610 have been merged into the main schema document 620).

The example framework 600 also includes a component for reorganizing 680 the merged schema document 670. The reorganization component 680 can resolve internal references and remove unnecessary elements (e.g., unneeded import and include elements) from the merged schema document 670 to produce a consolidated schema document 690.

Example of Converting XML/XSD to OWL

This section describes examples of converting XML/XSD documents to OWL using one or more of the techniques and solutions described herein.

First, an example of converting XML schema documents to a merged schema document and then to a consolidated schema document is described. Below are listed three XML schema documents. Document 3 "setlab.xsd" is an XML schema document that includes two other XML schema documents, Document 1 "Pin.xsd" and Document 2 "FNType.xsd". Document 4 depicts the merged XML schema document, which is the result of Document 1 and Document 2 being merged with Document 3. Document 5 depicts the consolidated XML schema, which is the result of reorganization performed on the merged XML schema (Document 4).

---

Document 1 - Pin.xsd

```
<?xml version="1.0" encoding="UTF-8"?>
<xs:schema
xmlns:xs="http://www.w3.org/2001/XMLSchema">
<xs:element name="Pin">
<xs:simpleType>
<xs:restriction base="xs:string"/>
</xs:simpleType>
</xs:element>
</xs:schema>
```

---

Document 2 - FNType.xsd

```
<?xml version="1.0" encoding="UTF-8"?>
<xsd:schema
xmlns:xsd="http://www.w3.org/2001/XMLSchema">
<xsd:simpleType name="FNType">
<xsd:restriction base="xsd:string"/>
</xsd:simpleType>
</xsd:schema>
```

| Document 3 - setlab.xsd |
| --- |
| ```xml
<?xml version="1.0" encoding="UTF-8"?>
<xsd:schema
xmlns:xsd="http://www.w3.org/2001/XMLSchema">
<xsd:include schemaLocation="FNType.xsd"/>
<xsd:include schemaLocation="Pin.xsd"/>
<xsd:element name="SETLab">
<xsd:complexType>
<xsd:sequence>
<xsd:element ref ="Computer"/>
<xsd:element name="Employee" type="EmployeeType"
maxOccurs="100"/>
<xsd:element ref ="Address"/>
</xsd:sequence>
</xsd:complexType>
</xsd:element>
<xsd:element name="Address">
<xsd:complexType>
<xsd:sequence>
<xsd:element name="City"> <xsd:simpleType>
<xsd:restriction base="xsd:string"/>
</xsd:simpleType> </xsd:element>
<xsd:element name="Country" type="xsd:string"/>
<xsd:element ref="Pin"/>
</xsd:sequence>
</xsd:complexType>
</xsd:element>
<xsd:element name="Computer">
<xsd:simpleType>
<xsd:restriction base="xsd:string"/>
</xsd:simpleType>
</xsd:element>
<xsd:complexType name="EmployeeType">
<xsd:sequence>
<xsd:element name="Name" type="NameType"/>
<xsd:element name="EmpID" type="xsd:integer"/>
</xsd:sequence>
<xsd:attribute name="EmpType" type="xsd:string"/>
<xsd:attribute name="Gender">
<xsd:simpleType>
<xsd:restriction base="xsd:string">
<xsd:enumeration value="Male"/>
<xsd:enumeration value="Female"/>
</xsd:restriction>
</xsd:simpleType>
</xsd:attribute>
</xsd:complexType>
<xsd:complexType name="NameType">
<xsd:sequence>
<xsd:element name="FirstName" type="FNType"/>
<xsd:element name="LastName" type="xsd:string"/>
</xsd:sequence>
</xsd:complexType>
</xsd:schema>
``` |

-continued

| Document 4 - merged.xsd |
| --- |
| ```xml
<xsd:complexType>
<xsd:sequence>
<xsd:element name="City">
<xsd:simpleType>
<xsd:restriction base="xsd:string"/>
</xsd:simpleType>
</xsd:element>
<xsd:element name="Country" type="xsd:string"/>
<xsd:element ref="Pin"/>
</xsd:sequence>
</xsd:complexType>
</xsd:element>
<xsd:element name="Computer">
<xsd:simpleType>
<xsd:restriction base="xsd:string"/>
</xsd:simpleType>
</xsd:element>
<xsd:complexType name="EmployeeType">
<xsd:sequence>
<xsd:element name="Name" type="NameType"/>
<xsd:element name="EmpID" type="xsd:integer"/>
</xsd:sequence>
<xsd:attribute name="EmpType" type="xsd:string"/>
<xsd:attribute name="Gender">
<xsd:simpleType>
<xsd:restriction base="xsd:string">
<xsd:enumeration value="Male"/>
<xsd:enumeration value="Female"/>
</xsd:restriction>
</xsd:simpleType>
</xsd:attribute>
</xsd:complexType>
<xsd:complexType name="NameType">
<xsd:sequence>
<xsd:element name="FirstName" type="FNType"/>
<xsd:element name="LastName" type="xsd:string"/>
</xsd:sequence>
</xsd:complexType>
<xsd:simpleType name="FNType">
<xsd:restriction base="xsd:string"/>
</xsd:simpleType>
<xsd:element name="Pin">
<xsd:simpleType>
<xsd:restriction base="xsd:string"/>
</xsd:simpleType>
</xsd:element>
</xsd schema>
``` |

| Document 4 - merged.xsd |
| --- |
| ```xml
<?xml version="1.0" encoding="UTF-8"?>
<xsd:schema xmlns:xsd="http://www.w3.org/2001/XMLSchema"
elementFormDefault="qualified"
attributeFormDefault="unqualified">
<xsd:include schemaLocation="FNType.xsd"/>
<xsd:include schemaLocation="Pin.xsd"/>
<xsd:element name="SETLab">
<xsd:complexType>
<xsd:sequence>
<xsd:element ref="Computer"/>
<xsd:element name="Employee"
type="EmployeeType" maxOccurs="100"/>
<xsd:element ref="Address"/>
</xsd:sequence>
</xsd:complexType>
</xsd:element>
<xsd:element name="Address">
``` |

| Document 5 - consolidated.xsd |
| --- |
| ```xml
<?xml version="1.0" encoding="UTF-8"?>
<xsd:schema xmlns:xsd="http://www.w3.org/2001/XMLSchema">
<xsd:element name="SETLab">
<xsd:complexType>
<xsd:sequence>
<xsd:element name="Computer">
<xsd:simpleType>
<xsd:restriction base="xsd:string"/>
</xsd:simpleType>
</xsd:element>
<xsd:element name="Employee" maxOccurs="100">
<xsd:complexType>
<xsd:sequence>
<xsd:element name="Name">
<xsd:sequence>
<xsd:element name="FirstName">
<xsd:simpleType name="FNType">
``` |

| Document 5 - consolidated.xsd |
| --- |
| ```
    <xsd:restriction base="xsd:string"/>
   </xsd:simpleType>
  </xsd:element>
  <xsd:element name="LastName" type="xsd:string"/>
 </xsd:sequence>
</xsd:element>
<xsd:element name="EmpID" type="xsd:integer"/>
</xsd:sequence>
<xsd:attribute name="EmpType" type="xsd:string"/>
<xsd:attribute name="Gender">
 <xsd:simpleType>
  <xsd:restriction base="xsd:string">
   <xsd:enumeration value="Male"/>
   <xsd:enumeration value="Female"/>
  </xsd:restriction>
 </xsd:simpleType>
</xsd:attribute>
</xsd:complexType>
</xsd:element>
<xsd:element name="Address">
 <xsd:complexType>
  <xsd:sequence>
   <xsd:element name="City">
    <xsd:simpleType>
     <xsd:restriction base="xsd:string"/>
    </xsd:simpleType>
   </xsd:element>
   <xsd:element name="Country" type="xsd:string"/>
   <xsd:element name="Pin">
    <xsd:simpleType>
     <xsd:restriction base="xsd:string"/>
    </xsd:simpleType>
   </xsd:element>
  </xsd:sequence>
 </xsd:complexType>
</xsd:element>
</xsd:sequence>
</xsd:complexType>
</xsd:element>
</xsd:schema>
``` |

Second, an example of generating an OWL model ontology and an OWL instance ontology from an XML document and an XML schema document is described. Below is listed an example XML schema document (Document 6—library.xsd) and its associated XML document (Document 7—library.xml). From these documents (Document 6 and 7), an OWL model ontology is generated (Document 8) and an OWL instance ontology is generated (Document 9). The OWL instance ontology (Document 9) uses a naming convention to identify different instance elements with the same tag name. For example, in an XML instance document, there can be multiple elements with a "Book" tag. In the OWL instance ontology these elements, while belonging to the same Class in the OWL model ontology, can be identified as separate instances, and therefore unique instance names can be used as identifiers. The naming convention appends a unique number to the element's tag name (e.g., "Book0" or "Book1"). To maintain the uniqueness of the numbering, a counter can be used for each element. For example, if a first "Book" element is encountered, an instance name of "Book0" can be used, the next "Book" element can be assigned an instance name of "Book1," and so on. In other implementations, different naming conventions can be used to uniquely distinguish between different instance elements with the same tag names.

| Document 6 - library.xsd |
| --- |
| ```
<?xml version="1.0"?>
<xs:schema>
 <xs:element name="Library">
  <xs:complexType>
   <xs:sequence>
    <xs:element name="Book">
     <xs:complexType>
      <xs:sequence>
       <xs:element name="Title" type="xs:string"/>
       <xs:element name="Author" type="xs:string"/>
      </xs:sequence>
     </xs:complexType>
    </xs:element>
    <xs:element name="Article" minOccurs="0" maxOccurs="10">
     <xs:complexType>
      <xs:sequence>
       <xs:element name="Title" type="xs:string"/>
      </xs:sequence>
     </xs:complexType>
    </xs:element>
   </xs:sequence>
  </xs:complexType>
 </xs:element>
</xs:schema>
``` |

| Document 7 - library.xml |
| --- |
| ```
<?xml version="1.0" encoding="UTF-8"?>
<SETLab labLocation="B1-HINJE"
 xmlns:xsi="http://www.w3.org/2001/XMLSchema-instance"
 xsi:schemaLocation="..\setlab.xsd">
 <Computer>DELL</Computer>
 <Company HQ="bangalore">Infosys</Company>
 <Desk>Desk1</Desk>
 <Desk>Desk2</Desk>
 <Desk>Desk3</Desk>
 <Employee EmpType="Trainee" Gender="Male">
  <Name>
   <FirstName>Damien</FirstName>
   <LastName>Lacoste</LastName>
  </Name>
  <EmpID>401689</EmpID>
 </Employee>
 <Employee EmpType="RA" Gender="Male">
  <Name>
   <FirstName>Kiran</FirstName>
   <LastName>Sawant</LastName>
  </Name>
  <EmpID>1138</EmpID>
 </Employee>
 <Address>
  <City>Pune</City>
  <Country>India</Country>
  <Pin>411057</Pin>
 </Address>
</SETLab>
``` |

| Document 8 - OWL Model Ontology |
| --- |
| ```
<Ontology>
<Declaration><Class IRI="#Article"/></Declaration>
<DataPropertyRange>
 <DataProperty IRI="#dtpTitle"/>
 <Datatype abbreviatedIRI="xsd:string"/>
</DataPropertyRange>
<Declaration><DataProperty IRI="#dtpTitle"/></Declaration>
<DataPropertyDomain>
 <DataProperty IRI="#dtpTitle"/>
 <Class IRI="#Article"/>
``` |

| Document 8 - OWL Model Ontology |
|---|

```xml
</DataPropertyDomain>
<Declaration><Class IRI="#Library"/></Declaration>
<Declaration><Object Property
IRI="#hasBook"/></Declaration>
<ObjectPropertyDomain>
<ObjectProperty IRI="#hasBook"/>
<Class IRI="#Library"/>
</ObjectPropertyDomain>
<ObjectPropertyRange>
<ObjectProperty IRI="#hasBook"/>
<Class IRI="#Book"/>
</ObjectPropertyRange>
<Declaration><ObjectProperty
IRI="#hasArticle"/></Declaration>
<ObjectPropertyDomain>
<ObjectProperty IRI="#hasArticle"/>
<Class IRI="#Library"/>
</ObjectPropertyDomain>
<ObjectPropertyRange>
<ObjectProperty IRI="#hasArticle"/>
<Class IRI="#Article"/>
</ObjectPropertyRange>
<EquivalentClasses>
<Class IRI="#Library"/>
<ObjectIntersectionOf>
<ObjectSomeValuesFrom>
<ObjectProperty IRI="#hasBook"/>
<Class IRI="#Book"/>
</ObjectSomeValuesFrom>
<ObjectMaxCardinality cardinality="10">
<ObjectProperty IRI="#hasArticle"/>
<Class IRI="#Article"/>
</ObjectMaxCardinality>
</ObjectIntersectionOf>
</EquivalentClasses>
<Declaration><Class IRI="#Book"/></Declaration>
<DataPropertyRange>
<DataProperty IRI="#dtpAuthor"/>
<Datatype abbreviatedIRI="xsd:string"/>
</DataPropertyRange>
<DataPropertyRange>
<DataProperty IRI="#dtpTitle"/>
<Datatype abbreviatedIRI="xsd:string"/>
</DataPropertyRange>
<Declaration><DataProperty IRI="#dtpTitle"/></Declaration>
<DataPropertyDomain>
<DataProperty IRI="#dtpTitle"/>
<Class IRI="#Book"/>
</DataPropertyDomain>
<Declaration><DataProperty
IRI="#dtpAuthor"/></Declaration>
<DataPropertyDomain>
<DataProperty IRI="#dtpAuthor"/>
<Class IRI="#Book"/>
</DataPropertyDomain>
</Ontology>
```

| Document 9 - OWL Instance Ontology |
|---|

```xml
<?xml version="1.0" encoding="UTF-8"?>
<Ontology>
<ClassAssertion>
<Class IRI="#Library"/>
<NamedIndividual IRI="#Library0"/>
</ClassAssertion>
<ClassAssertion>
<Class IRI="#Article"/>
<NamedIndividual IRI="#Article0"/>
</ClassAssertion>
<ObjectPropertyAssertion>
<ObjectProperty IRI="#hasArticle"/>
<NamedIndividual IRI="#Library0"/>
<NamedIndividual IRI="#Article0"/>
</ObjectPropertyAssertion>
<DataPropertyAssertion>
<DataProperty IRI="#dtpTitle"/>
<NamedIndividual IRI="#Article0"/>
<Literal datatypeIRI="#string">Tit_C</Literal>
</DataPropertyAssertion>
<ClassAssertion>
<Class IRI="#Book"/>
<NamedIndividual IRI="#Book0"/>
</ClassAssertion>
<ObjectPropertyAssertion>
<ObjectProperty IRI="#hasBook"/>
<NamedIndividual IRI="#Library0"/>
<NamedIndividual IRI="#Book0"/>
</ObjectPropertyAssertion>
<DataPropertyAssertion>
<DataProperty IRI="#dtpAuthor"/>
<NamedIndividual IRI="#Book0"/>
<Literal datatypeIRI="#string">Aut_A</Literal>
</DataPropertyAssertion>
<DataPropertyAssertion>
<DataProperty IRI="#dtpTitle"/>
<NamedIndividual IRI="#Book0"/>
<Literal datatypeIRI="#string">Tit_A</Literal>
</DataPropertyAssertion>
<ClassAssertion>
<Class IRI="#Article"/>
<NamedIndividual IRI="#Article1"/>
</ClassAssertion>
<ObjectPropertyAssertion>
<ObjectProperty IRI="#hasArticle"/>
<NamedIndividual IRI="#Library0"/>
<NamedIndividual IRI="#Article1"/>
</ObjectPropertyAssertion>
<DataPropertyAssertion>
<DataProperty IRI="#dtpTitle"/>
<NamedIndividual IRI="#Article1"/>
<Literal datatypeIRI="#string">Tit_B</Literal>
</DataPropertyAssertion>
</Ontology>
```

Exemplary Computing Devices

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices. The techniques and solutions described herein can be performed in a cloud computing environment (e.g., comprising virtual machines and underlying infrastructure resources).

Figure 7:
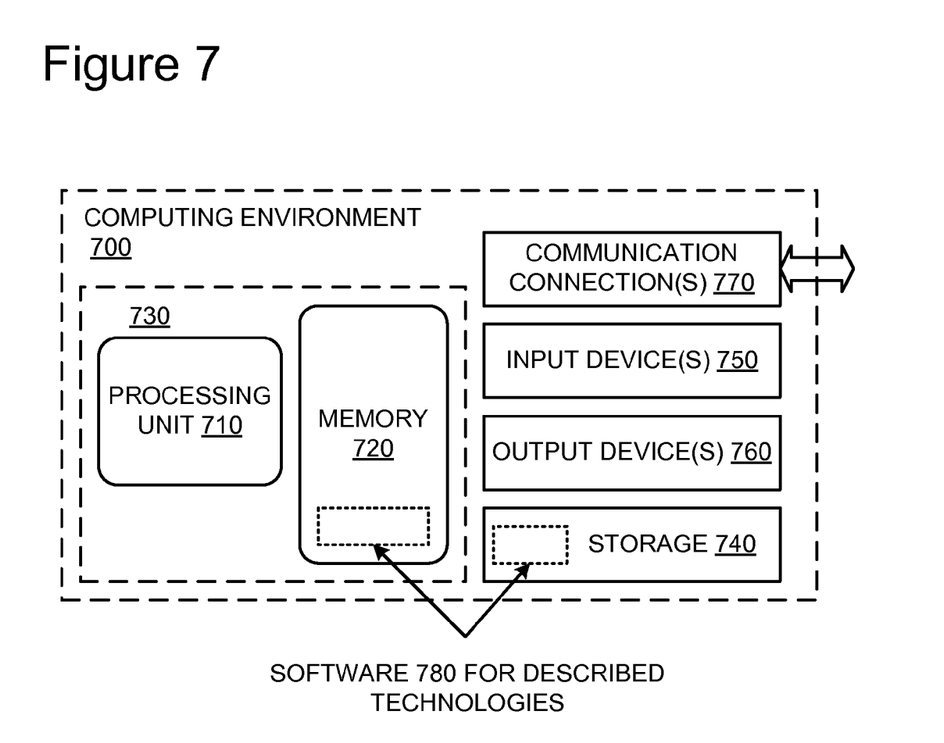
FIG. 7 is a block diagram illustrating an example mobile computing device in conjunction with which techniques and tools described herein may be implemented.

FIG. 7 illustrates a generalized example of a suitable computing environment 700 in which described embodiments, techniques, and technologies may be implemented. The computing environment 700 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, the computing environment 700 includes at least one central processing unit 710 and memory 720. In FIG. 7, this most basic configuration 730 is included within a dashed line. The central processing unit 710 executes computer-executable instructions. In a multi-processing system, multiple processing units execute computer-executable instructions to increase processing power and as such, multiple processors can be running simultaneously. The memory 720 may be volatile memory (e.g., registers, cache, RAM), non-volatile memory (e.g., ROM, EEPROM, flash memory, etc.), or some combination of the two. The memory 720 stores software 780 that can, for example, implement the technologies described herein. A computing environment may have additional features. For example, the computing environment 700 includes storage 740, one or more input devices 750, one or more output devices 760, and one or more communication connections 770. An interconnection mechanism (not shown) such as a bus, a controller, or a network, interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other tangible storage medium which can be used to store information and which can be accessed within the computing environment 700. The storage 740 stores instructions for the software 780, which can implement technologies described herein.

The input device(s) 750 may be a touch input device, such as a keyboard, keypad, mouse, pen, or trackball, a voice input device, a scanning device, or another device, that provides input to the computing environment 700. For audio, the input device(s) 750 may be a sound card or similar device that accepts audio input in analog or digital form, or a CD-ROM reader that provides audio samples to the computing environment 700. The output device(s) 760 may be a display, printer, speaker, CD-writer, or another device that provides output from the computing environment 700.

The communication connection(s) 770 enable communication over a communication medium (e.g., a connecting network) to another computing entity. The communication medium conveys information such as computer-executable instructions, compressed graphics information, or other data in a modulated data signal.

Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as flash memory or hard drives)) and executed on a computer (e.g., any commercially available computer, including smart phones or other mobile devices that include computing hardware). By way of example and with reference to FIG. 7, computer-readable storage media include memory 720 and/or storage 740. As should be readily understood, the term computer-readable storage media does not include communication connections (e.g., 770) such as modulated data signals.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, devices, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method, implemented at least in part by a computing device, for converting extensible markup language (XML) to web ontology language (OWL), the method comprising:
   receiving one or more XML documents;
   receiving a plurality of XML schema documents;
   performing, by the computing device, model extraction using the plurality of XML schema documents, the model extraction comprising:

performing schema consolidation on the plurality of XML schema documents to generate a consolidated XML schema document, the performing schema consolidation comprising:
  storing namespaces and associated namespace prefixes from the one or more XML documents and the plurality of XML schema documents into a hash;
  merging the plurality of XML schema documents to create a merged XML schema document, the merging comprising:
    examining the hash for each namespace prefix; and
    adding the namespace prefix to elements and attributes of the merged XML schema document; and
  reorganizing the merged XML schema document comprising resolving internal references, the reorganizing comprising removing include elements and import elements in the reorganized merged XML schema document; and
  generating, using the consolidated XML schema document, an OWL model ontology;
performing, by the computing device, instance generation using the one or more XML documents and the plurality of XML schema documents to create an OWL instance ontology; and
outputting, by the computing device, the OWL model ontology and the OWL instance ontology.

2. The method of claim 1, wherein the plurality of XML schema documents comprise:
  a main XML schema document; and
  one or more other XML schema documents that are included or imported by the main XML schema document.

3. The method of claim 1, wherein one of the stored namespaces and associated namespace prefixes is determined to be a main namespace and associated namespace prefix.

4. The method of claim 1, wherein the merging comprises using a consistent namespace and associated namespace prefix throughout all elements and attributes of the merged XML schema document.

5. The method of claim 1, wherein the performing schema consolidation further comprises collecting information related to the plurality of XML schema documents, wherein the information comprises schema location, namespace, and namespace prefix; and
  wherein the merging comprises using a consistent namespace and associated namespace prefix.

6. The method of claim 1, wherein model extraction and the instance generation are performed in parallel.

7. A framework implemented at least in part by a computing device,
  the computing device comprising a processor; and
  a memory storing instructions that, when executed by the processor, cause the processor to perform converting extensible markup language (XML) to web ontology language (OWL), the framework comprising:
    a model extraction component configured to perform operations comprising:
      receiving a plurality of XML schema documents;
      performing schema consolidation on the plurality of XML schema documents to generate a consolidated XML schema document, the performing schema consolidation comprising:
        storing namespaces and associated namespace prefixes from the one or more XML documents and the plurality of XML schema documents into a hash;
        merging the plurality of XML schema documents to create a merged XML schema document, the merging comprising:
          examining the hash for each namespace prefix; and
          adding the namespace prefix to elements and attributes of the merged XML schema document; and
        reorganizing the merged XML schema document comprising resolving internal references, the reorganizing comprising removing include elements and import elements in the reorganized merged XML schema document;
      generating, using the consolidated XML schema document, an OWL model ontology; and
      outputting the OWL model ontology; and
    an instance generation component configured to perform operations comprising:
      receiving one or more XML documents;
      receiving the plurality of XML schema documents;
      generating, using the one or more XML documents and the plurality of XML schema documents an OWL instance ontology; and
      outputting the OWL instance ontology.

8. The framework of claim 7, wherein the plurality of XML schema documents comprise:
  a main XML schema document; and
  one or more other XML schema documents that are included or imported by the main XML schema document.

9. The framework of claim 7, wherein the merging comprises using a consistent namespace and associated namespace prefix throughout all elements and attributes of the merged XML schema document.

10. The framework of claim 7,
  wherein the merging comprises using a consistent namespace and associated namespace prefix.

11. The framework of claim 7, wherein the model extraction component and the instance generation component operate in parallel.

12. A computer-readable storage medium storing computer-executable instructions for causing a computing device to perform a method for converting extensible markup language (XML) to web ontology language (OWL), the method comprising:
  receiving one or more XML documents;
  receiving a plurality of XML schema documents;
  performing, by the computing device, model extraction using the plurality of XML schema documents, the model extraction comprising:
    performing schema consolidation on the plurality of XML schema documents to generate a consolidated XML schema document; and
    generating, using the consolidated XML schema document, an OWL model ontology;
  performing, by the computing device, instance generation using the one or more XML documents and the plurality of XML schema documents to create an OWL instance ontology; and
  outputting, by the computing device, the OWL model ontology and the OWL instance ontology;
  wherein model extraction and the instance generation are performed in parallel; and
  wherein the performing schema consolidation comprises:
    storing namespaces and namespace prefixes from the one or more XML documents and the plurality of XML schema documents into a hash;

merging the plurality of XML schema documents to create a merged XML schema document, the merging comprising:
  examining the hash for each namespace prefix; and
  adding the namespace prefix to elements and attributes of the merged XML schema document; and
  reorganizing the merged XML schema document comprising resolving internal references, the reorganizing comprising removing include elements and import elements in the reorganized merged XML schema document.

13. The computer-readable storage medium of claim 12, wherein the plurality of XML schema documents comprise:
  a main XML schema document; and
  one or more other XML schema documents that are included or imported by the main XML schema document.

14. The computer-readable storage medium of claim 12, wherein the merging comprises using a consistent namespace and associated namespace prefix throughout all elements and attributes of the merged XML schema document.

15. The method of claim 1, wherein model extraction and the instance generation are performed without using an extensible stylesheet language transformations (XSLT) document.

16. The framework of claim 7, wherein the model extraction component and the instance generation component operate without using an extensible stylesheet language transformations (XSLT) document.

17. The computer-readable storage medium of claim 12, wherein model extraction and the instance generation are performed without using an extensible stylesheet language transformations (XSLT) document.

* * * * *